C. H. GUNN.
TIRE CONSTRUCTION FOR VEHICLE WHEELS.
APPLICATION FILED SEPT. 3, 1918.
1,308,416.
Patented July 1, 1919.
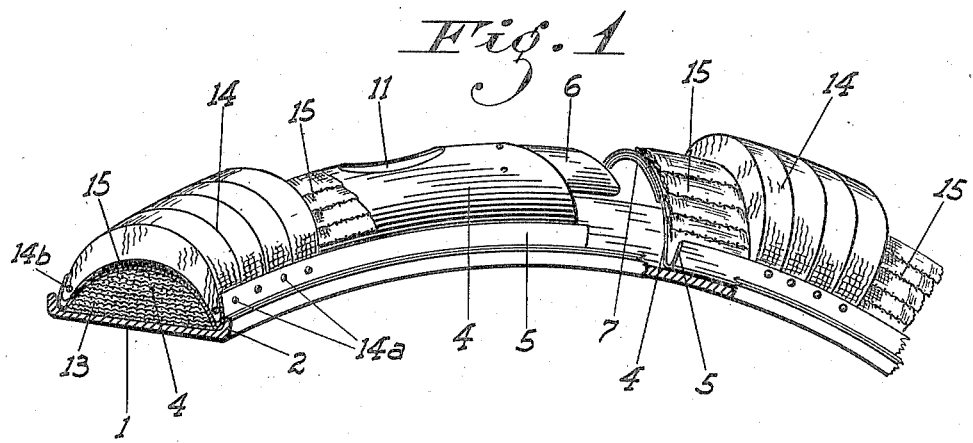
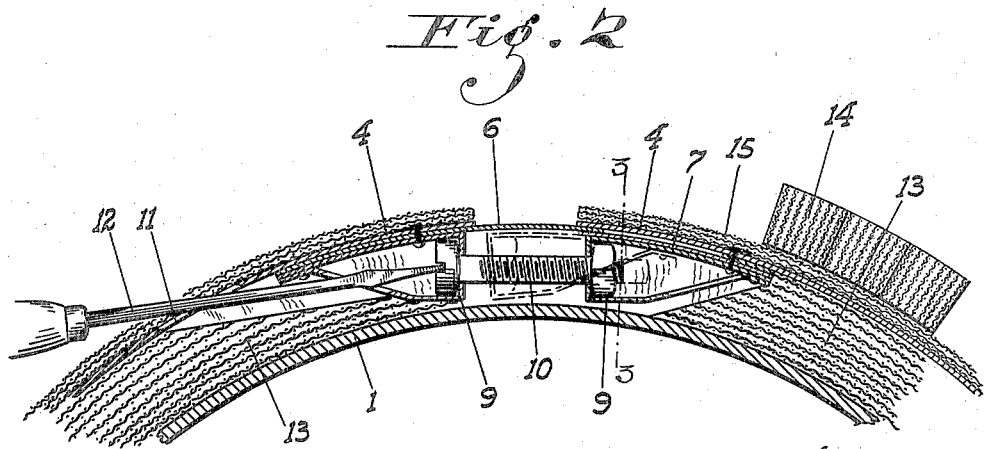
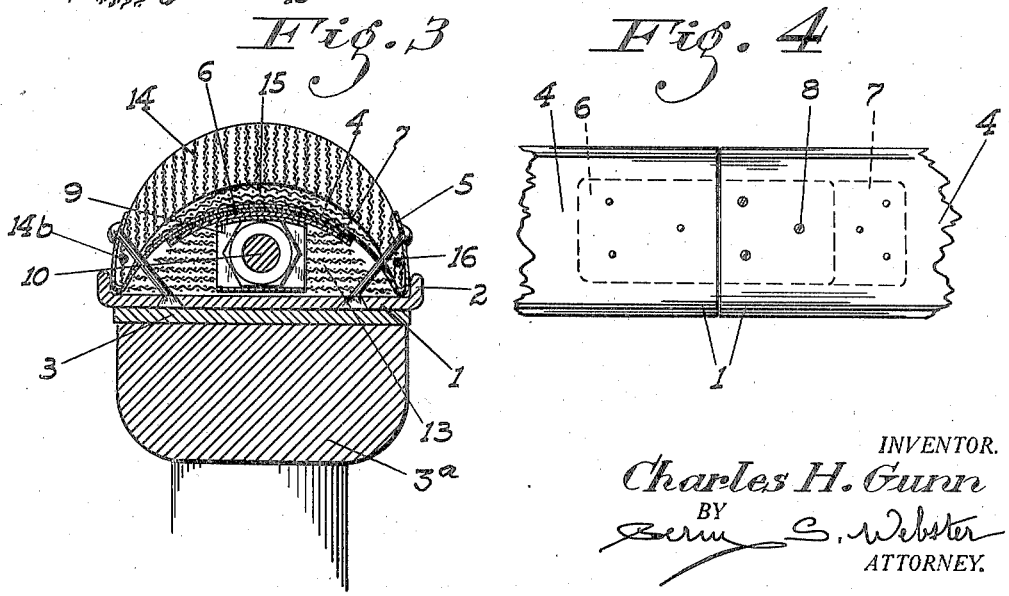
INVENTOR.
Charles H. Gunn
BY
Berry S. Webster
ATTORNEY.

UNITED STATES PATENT OFFICE.

CHARLES H. GUNN, OF EMERYVILLE, CALIFORNIA.

TIRE CONSTRUCTION FOR VEHICLE-WHEELS.

1,308,416.  Specification of Letters Patent.  Patented July 1, 1919.

Application filed September 3, 1913. Serial No. 252,322.

*To all whom it may concern:*

Be it known that I, CHARLES H. GUNN, a citizen of the United States of America, residing at Emeryville, in the county of Alameda, State of California, have invented certain new and useful Improvements in Tire Constructions for Vehicle-Wheels; and I do declare the following to be a clear, full, and exact description of the same, reference being had to the accompanying drawings, and to the characters of reference marked thereon, which form a part of this application.

This invention relates to solid tires for vehicle wheels, the principal object of the invention being to provide a built-up tire which may be easily assembled and secured in position on a wheel having a plain steel band tire.

Another object has been to produce a built-up tire which will have considerably more resiliency than the present form of solid tires.

These objects, I accomplish by means of such structure and relative arrangements of the parts as will fully appear by a perusal of the following specification and claims.

On the drawings, similar characters of reference indicate corresponding parts in the several views.

Figure 1 is a perspective view showing the lapping ends of the tread-block retainer, with some of the blocks omitted.

Fig. 2 is a longitudinal section of the portion of the tire shown in Fig. 1.

Fig. 3 is a cross-section taken relatively on a line 3—3 of Fig. 2, after the last tread blocks have been riveted in place.

Fig. 4 is a fragmentary top plan view showing the ends of the tread block retainer after they have been lapped and fastened together.

Referring now more particularly to the figures of reference on the drawings, the numeral 1 represents a metallic endless rim which has outwardly extending flanges 2 on the edges thereof. This rim is adapted to be mounted on the band-tire 3 of a wheel 3ª after the improved tire hereinafter described has been secured to the rim 1. Adapted to seat on the rim 1 between the flanges 2 is a metallic band or tread block retainer 4 which is of arched cross-section and has its edges turned back as at 5 to substantially form a V at each edge.

One end of the band 4 is provided with a lip or tongue 6 secured to and projecting from the same, while the other end is provided with a strip or band 7 secured to the band 4 and being spaced therefrom sufficiently to permit of the tongue 6 sliding therebetween so that the ends of the band 4 will abut.

Screws 8 hold the tongue to the adjacent end of the band 4 and the strip 7 and are inserted when the ends have been brought together and lapped in the manner hereinafter described. At each end of the band 4 between the same and the rim 1 is a suitably braced boss 9, each provided with an orifice for the reception of a slot-headed bolt 10 therethrough. The band 4 is also provided with an orifice 11 in line with the slot-head of the bolt 10 whereby a screwdriver 12 may be inserted therethrough to turn up the bolt on its nut and thus draw the two ends of the band 4 together.

The space between the band 4 and the rim 1 is filled by a continuous strip of segment-shaped fabric or wood 13, excepting where the bosses 9 project, where it is suitably cut away, the band 4 not being intended to yield when under load, but being arch-shaped to lessen the amount of material in the tread blocks hereinafter described.

The portion 13 acts as a filler between the rim 1 and the arched band 4, and also provides against the possibility of the band being dented in by a pointed obstruction in the path of the tire.

On the band 4 are suitably secured a plurality of rubberized fabric tread blocks 14, the edges thereof seating in the V-shaped bends and being screwed thereto as by screws 14ª. Transverse rivets 14ᵇ are placed through each tread block adjacent the screws 14ª in order to prevent the material of the block from spreading or breaking at this point, which is where most of the pulling strain is concentrated. A small space is left, however, between the band 4 and the inner face of the blocks, which space is filled with laminations 15 of canvas or similar material which act as a cushion for the tread blocks. Before the band 4 is secured to the rim 1, however, the blocks which cover the lapping ends of the band are omitted in order to permit of the screwdriver being inserted into the orifice 11 in the band to draw up on the bolt 10 and also permit of the screws 8 being inserted through the tongue 6 and band 4. When this is accomplished, however, the required remaining number of tread blocks are inserted in place, which last blocks are secured by rivets 16 which pass through the V-shaped bends of the band 4, and through the rim 1, as well, thus holding the entire structure together as a complete unit. When these blocks are in place, and their rivets inserted, the tire is pressed onto the band tire 3 of the wheel 3ª in any manner known to the art.

Thus, from the foregoing description, it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as set forth herein.

Having thus described my invention, what I claim as new and useful and desire to secure by Letters Patent is:—

1. A tire for vehicle wheels comprising an endless flanged rim adapted to be pressed onto a wheel, an arched band having its edges turned outwardly to form V-shaped grooves, the edges being seated between and adjacent the flanges of the rim, a strip of segment-shaped material positioned between the band and the rim, tread blocks of rubberized fabric secured to the band and extending into the V-shaped grooves thereof and means whereby the ends of the band may be drawn together to frictionally lock the same on the rim.

2. A tire for vehicle wheels comprising an endless flanged rim adapted to be pressed onto a wheel, an arched band having its edges turned outwardly to form V-shaped grooves, the edges being seated between and adjacent the flanges of the rim, a strip of segment-shaped material positioned between the band and the rim, tread blocks of rubberized fabric secured to the band and spaced slightly therefrom, and laminations of canvas between the blocks and the band, whereby a cushion between the blocks and the band will be formed.

3. The combination with a wheel having an endless flanged rim and an arched tread-block retaining band seated in the rim, of means whereby the ends of the band may be drawn together to frictionally lock the band on the rim, such means comprising a tongue on one end of the band adapted to slide into a groove formed in the adjacent end and riveted to the adjacent end when such ends abut, a boss on each end depending therefrom between the band and the rim, and a bolt connecting the bosses, the bolt being provided with a slotted head whereby the bolt may be turned to draw the bosses together by a screwdriver inserted through an orifice provided in the band.

In testimony whereof I affix my signature in presence of two witnesses.

CHARLES H. GUNN.

Witnesses:
BERNARD PRIVAT,
FRANK H. CARTER.